Patented June 15, 1943

2,322,198

UNITED STATES PATENT OFFICE 2,322,198

COATING COMPOSITION

Clinton H. Parsons, Chicago, Ill., assignor to Industrial Patents Corporation, Chicago, Ill., corporation of Delaware No Drawing. Application March 15, 1941,
Serial No. 383,547

10 Claims. (Cl. 99—166)

This invention relates to coating compositions and has to do particularly with an improved wax composition for coating of cheese.

In the manufacture of cheese, the curd is pressed into the desired shape or size and allowed to remain exposed to the atmosphere for a short period. During this exposure, the surface of the cheese curd dries out to form a rind on the block of cheese. In order to prevent excessive mold growth on the surface of the cheese during the aging period, the cheese, after the rind has formed, is generally dipped into molten paraffin. Since the surface of the cheese is somewhat moist or oily, the paraffin does not always adhere firmly to the surface.

During the aging or storage period, the cheese is generally subjected to temperatures below ordinary room temperatures. Since the paraffin is somewhat brittle, particularly at storage temperatures and since it does not adhere firmly to the cheese, the coating cracks and small pieces of paraffin will chip from the surface of the cheese. As a result, an excessive mold growth may develop along the lines of the cracks and wherever the coating has become chipped from the surface.

An object of the present invention is to provide a cheese coating which will adhere to the surface of the cheese.

Another object of the invention is to provide a cheese coating which is little affected by temperature changes and will not chip or crack.

A further object of the invention is to provide a cheese coating which is plastic over a wide range of temperatures.

In accordance with the present invention, a small amount of an ester of a fatty acid and a polyhydric alcohol, having one or more free alcoholic hydroxyl groups on the polyhydric alcohol component of the ester, is added to certain waxes and the resulting mixture applied to the cheese whereby an improved coating is obtained.

The esters which may be used comprise partial glyceride esters of fatty esters, such as monoglycerides and diglycerides, mono-acid esters of ethylene glycol or of diethylene glycol, or any ester of a polyhydric alcohol and fatty acids characterized by having one or more free alcoholic hydroxyl groups on the polyhydric alcohol component of the ester. A satisfactory substance is the reaction product of glycerin and triglyceride fat heated in the presence of soap as a catalyst, although the esters prepared in any suitable manner may be used.

The foregoing type of esters have been added to various waxy materials heretofore, but none of these mixtures are similar to those of the present invention nor give applicant's results. For example, the patent to Schrauth, No. 1,932,643, discloses mixtures of several waxes and mono- or diglycerides of fatty acids, such as stearic or palmitic acids. The mono- or diglycerides are present in relatively large amounts of the order of 25 per cent or more. The products are emulsifying agents which take up 500 per cent or 600 per cent water to form lubricants, pastes, polishing creams, insecticides and oil emulsions for roads.

The patent to Lazier et al., No. 2,027,390, states that a material may be made both oil-proof and water-proof, suitable for wrappers or containers for aqueous and oil products by impregnating the material with a diglyceride of hydrogenated castor oil.

The patent to Geller, No. 1,866,025, shows the manufacture of molded candles from beeswax containing derivatives of dihydric alcohols, for example, mono-esters of glycol and lower fatty acids, such as glycol monoacetate. These candles are stated to have the property of not sticking to the molds.

The present invention contemplates the addition of the ester to the wax in critical amounts to produce the desired results. It is contemplated that the ester be added in sufficient amount to produce a plasticity in the wax over a wide range of temperatures whereby chipping, cracking and shrinking away from the surface of the cheese is avoided. It is also intended that the ester be used in sufficient amount to pick up surface moisture on the cheese but in insufficient amount to alter materially the plastic properties of the wax and also in insufficient amounts to take up large quantities of moisture which might produce to a degree fluid-like emulsions. In general, I prefer to use about 5 per cent to 20 per cent of the ester and preferably around 10 per cent to 15 per cent.

The waxes that may be used in the invention comprise a wide range of petroleum waxes, including paraffin or scale wax of about 126 degrees to 130 degrees F. and any of the higher melting point amorphous microcrystalline waxes of melting point of about 140 degrees to 165 degrees F. Paraffin waxes or any of the amorphous waxes may be used alone as the wax component. Also various mixtures of the paraffin and amorphous waxes, for example, two or three component mixtures may be used.

Examples of two component wax mixtures are a mixture of paraffin and 140–145 degrees F. melting point amorphous wax, or a mixture of paraffin wax in 160–165 degrees F. melting point amorphous wax. An example of a three component mixture is paraffin, a 140–145 degrees F. melting point amorphous wax and a 160–165 degrees F. melting point amorphous wax. Satisfactory mixtures have been prepared containing about 40 to 50 per cent paraffin or scale wax, 55 to 30 per cent of 140–145 degrees F. melting point amorphous wax or about 55 to 30 per cent of 160–165 degrees F. melting point amorphous wax or about 55 to 30 per cent of a mixture of about equal amounts of the latter amorphous waxes.

The invention will be more fully understood from the examples which follow:

Example 1

A sample of green cheese directly from the molds and containing a substantial amount of moisture and oil on the surface is coated with a mixture of 85 per cent of paraffin wax and 15 per cent of a mixture of monoglycerides and diglycerides prepared by glycerinating partially hydrogenated cottonseed oil. The wax adheres firmly to the surface without chipping or cracking over a wide temperature range.

Example 2

A sample of aged cheese is wiped to remove a portion of the oil, mold and slime on the surface and is then coated with a mixture of 85 per cent of amorphous wax of melting point of about 135–145 degrees F. and 15 per cent of mono- and diglycerides similar to those of Example 1. The coating adhered firmly to the surface and appears to absorb the moisture.

Example 3

A sample of aged cheese from which the rind is removed leaving it moist on the surface is coated with a mixture of 80 per cent wax and 20 per cent of esters formed by superglycerinating soy bean oil. The coating absorbs the moisture and adheres firmly to the surface.

Example 4

A sample of aged cheese which had become stained with oil and mold is covered with a secondary coating composed of a mixture of 40 per cent paraffin wax, 45 per cent of amorphous wax of melting point of about 155 to 165 degrees F. and 15 per cent of mono- and diglycerides of cottonseed oil. The coating adheres firmly to the cheese and is stable under a wide range of temperatures.

Example 5

A green cheese of which the surface is more or less moist is coated with a mixture of 40 per cent paraffin wax, 20 per cent amorphous wax of 135–145 degrees F. melting point, 25 per cent of amorphous wax of 155–165 degrees F. melting point and 15 per cent monoglycerides of cottonseed oil. The coating adheres firmly to the cheese forming a continuous coating which is plastic over a wide temperature range.

Example 6

An aged cheese with a moist surface was recoated with a mixture of 30 per cent paraffin wax, 40 per cent high melting petroleum wax (cerese), 15 per cent amorphous petroleum waxes (candy wax) and 15 per cent partial glycerides. The mixture forms a plastic adherent coating.

The coating may be applied to the cheese by dipping, brushing, spraying, etc. I prefer to dip the cheese in the coating.

The coatings of the present invention are not only effective in the application of a secondary wax coating to aged cheese, but are particularly useful as coatings for green or moist cheese. Ordinarily green cheese may not be coated until after it has been surface dried to form a rind to which the paraffin will adhere. Thus, before such a cheese can be consumed, the rind must be removed, thereby incurring a loss by consumer. With the present wax mixture, cheese may be coated promptly after discharge from the forming molds because the wax is adherent to the moist surface of the cheese.

A cheese coating prepared with the wax of the present invention is smoother and presents a more polished appearance than paraffin and is more flexible. I have found that cheese coated with this wax can be held at lower temperatures with greatly reduced surface cracking. The wax of the present invention also affords more protection against moisture loss and consequently reduces shrinkage during storage.

This application is a continuation-in-part of my copending application, Serial No. 170,264, filed October 21, 1937.

Obviously many modifications and variations of the invention hereinbefore set forth may be made without departing from the spirit and scope thereof, and therefore only such limitations should be imposed as are indicated in the appended claims.

I claim:

1. The method of coating cheese which comprises applying to the surface of the cheese a waxy mixture containing essentially a petroleum wax and about 5 to 20 per cent of a partial ester ingredient composed of at least one ester of a fatty acid and a polyhydric alcohol having one or more free alcoholic hydroxyl group on the polyhydric alcoholic component of the ester, said mixture having the properties of adhering firmly to the cheese and being plastic over a wide range of temperatures.

2. A process according to claim 1 in which the petroleum wax is paraffin wax of about 126 to 128 degrees F. melting point.

3. A process according to claim 1 in which the petroleum wax is an amorphous wax of melting point with the range of about 140 and 165 degrees F.

4. A process according to claim 1 in which the petroleum wax is a mixture of paraffin of about 126 to 128 degrees F. melting point and amorphous wax of melting point between about 140 and 165 degrees F.

5. A process of coating cheese which comprises applying to the surface of the cheese a coating containing essentially a mixture of an amorphous petroleum wax and about 5 to 20 per cent of a partial ester ingredient composed of at least one ester of the class of monoglycerides and diglycerides of a fatty acid and a polyhydric alcohol.

6. A cheese coating waxy composition comprising essentially a mixture of a petroleum wax and about 5 to 20 per cent of a partial ester ingredient containing at least one ester of a fatty acid and a polyhydric alcohol having one or more free alcoholic groups on the polyhydric alcohol component of the ester.

7. A cheese coating waxy composition comprising essentially a petroleum wax of the class of paraffin wax of melting point of 126 to 128 degrees F., amorphous petroleum wax of melting point of about 140 to 145 degrees F., and amorphous petroleum wax of melting point of about 160 to 165 degrees F., and about 5 to 20 per cent of a partial ester ingredient containing at least one ester of the class of monoglycerides and diglycerides.

8. A cheese coating waxy composition comprising essentially about 85 per cent of paraffin wax of about 126 to 128 degrees melting point and about 15 per cent of a partial ester ingredient containing at least one partial glyceride ester of fatty acids.

9. A cheese coating waxy composition comprising essentially 80 per cent of an amorphous petroleum wax having a melting point between about 140 and 165 degrees F. and about 20 per cent of a partial ester ingredient containing at least one partial glyceride ester of higher fatty acids.

10. A cheese coating waxy composition comprising essentially about 30 per cent paraffin, about 40 per cent of an amorphous wax of about 155 to 165 degrees F. melting point (cerese), about 15 per cent of an amorphous wax of about 135-145 degrees F. melting point (candy wax) and about 15 per cent of a partial ester ingredient containing at least one ester of a fatty acid and a polyhydric alcohol having one or more free alcoholic hydroxyl group on the polyhydric alcohol component of the ester.

CLINTON H. PARSONS.